(No Model.)

C. E. WNUCK.
SHAFT GEAR FOR VEHICLES.

No. 430,410. Patented June 17, 1890.

Witnesses
David Davis
Ella Hosea.

Inventor
Charles E. Wnuck

By Attorney

UNITED STATES PATENT OFFICE.

CHARLES E. WNUCK, OF CINCINNATI, OHIO.

SHAFT-GEAR FOR VEHICLES.

SPECIFICATION forming part of Letters Patent No. 430,410, dated June 17, 1890.

Application filed January 24, 1890. Serial No. 337,945. (No model.)

*To all whom it may concern:*

Be it known that I, CHARLES E. WNUCK, a citizen of the United States, residing at Cincinnati, Ohio, have invented new and useful Improvements in Shaft-Gear for Vehicles, of which the following is a specification.

My invention relates to shaft-gear for vehicles, its object being to produce a more economical construction and one which shall provide adjustability between the shafts and the saddle by which the same are supported upon the back of the horse, whereby lateral shifting of the saddle and injuries resulting therefrom to the back of the draft-animal may be prevented, and with also the further object of equalizing the draft-strains upon the axle by transferring an equal portion to the center of the same.

To this end my invention consists in the construction of two independent shafts pivotally connected to the axle outwardly near the wheels in the usual manner, each provided with a diagonal brace forward of its pivotal connection with the axle and extending thence inwardly and rearwardly to a pivotal connection with the axle beneath the fifth-wheel. I also attach to each shaft a tug-link of peculiar construction for the trace-connections as a substitute for the ordinary singletree, to equalize the strains upon the breast-strap or collar.

Mechanism embodying my invention is exhibited in the accompanying drawings, in which—

Figure 1:
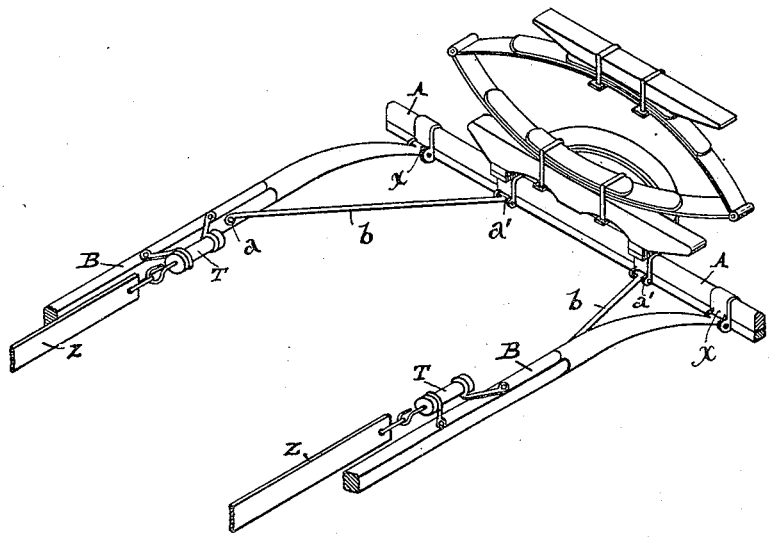
Figure 2:
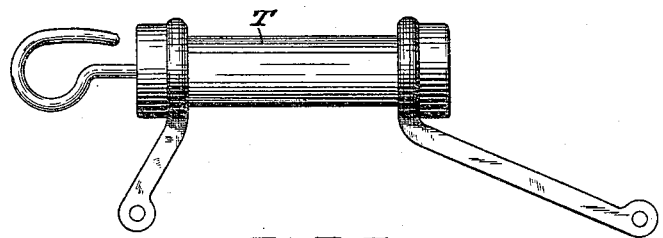

Figure 1 is a perspective view of so much of the front axle and shafts as exhibits my invention complete; Fig 2, a detached view of the tug-link and its shaft attachment, and Fig. 3 an axial section of the same.

Referring now to the drawings, A designates the front axle of a single-draft vehicle, and B B the two shafts, bowed and connected with the axle by the usual thill-couplings $x$.

In my invention I omit the usual rigid cross-bar connecting the two shafts at the rear of the animal into a rigid frame and attach to each shaft at $a$ a diagonal brace $b$, extending inwardly toward the center and rearwardly to a pivotal coupling $a'$, with the axle beneath the fifth-wheel, these connections being in effect duplicates of the thill-couplings $x$ of the shaft—that is to say, the lower plates of the fifth-wheel clips are extended forward and provided for the pivoting of the braces to in the same manner as the thill-couplings, &c., of the shafts.

Each shaft, with its diagonal brace rigidly secured thereto, constitutes a rigid frame pivotally connected to the axle at two points and free to move pivotally on its double axle-connection in a vertical plane, thereby allowing the shafts to adjust themselves upon the saddle-supports and permit the movements of the animal's body without moving the saddle laterally upon the animal's back. The construction also distributes the pulling-strain along the axle to much better advantage than in the ordinary construction of the shaft as an entire frame.

Figure 3:
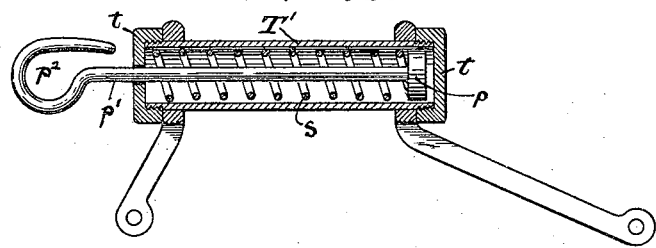

As stated, I employ in connection with the independent shafts B tug-links T, constructed as shown in Figs. 2 and 3, and attached to the shafts, as shown in Fig. 1. These each consist of a short section of tube T', provided with heads or end caps $t$, and fitted with a piston $p$, to which is attached a piston-rod $p'$, projecting forward through the casing T. Within the casing and forward of the piston is placed a strong spiral spring $s$. The forward end of the piston-rod is turned into a suitably-formed hook $p^2$, for the attachment of the traces $z$, as indicated in Fig. 1. The link thus described forms a simple, efficient, and durable structure, which, according to the side uppermost in attaching it, answers for the right or left shaft, and stands well within each shaft, so as to bring the pulling-traces parallel. Moreover, it incases and protects the spring from all injuries of abrasion, as also from moisture of rains, &c. It will also be perceived that by the construction and mode of attachment of the spring-link in relation to the shafts the pull upon the traces throws the draft-strains toward the center of the axle, and by so much relieves the axle of any tendency to breakage from draft-strains.

The diagonal braces, while preferably of iron, may be of wood, similar to the bowed shank of the shaft, each shaft being thus in effect bifurcated at the rear.

I claim as my invention, and desire to secure by Letters Patent of the United States—

1. In shaft-gear for vehicles, the combination of two independent shafts pivotally coupled to the axle in the usual manner, each provided with a diagonal brace rigidly connected with the inner side of its shaft and extending to a pivoted coupling with the fifth-wheel clip, substantially as set forth.

2. The combination of the independent pivoted shafts, each having a rigid diagonal brace extending to pivotal connection with the fifth-wheel brace, with a spring trace-connection placed at the inner side of the shaft and sufficiently distant to bring the lines of draft approximately parallel and transmit a portion of the resulting draft-strains to the fifth-wheel connection by means of the diagonal braces, substantially as set forth.

In testimony whereof I have hereunto set my hand in the presence of two subscribing witnesses.

CHARLES E. WNUCK.

Witnesses:
L. M. HOSEA,
ELLA HOSEA.